(12) United States Patent
Rasheed et al.

(10) Patent No.: US 9,716,315 B2
(45) Date of Patent: Jul. 25, 2017

(54) AUTOMATIC HIGH-RESOLUTION ADAPTIVE BEAM-STEERING

(71) Applicants: Irshad Rasheed, Fremont, CA (US); Christopher T. Schiller, Redding, CA (US)

(72) Inventors: Irshad Rasheed, Fremont, CA (US); Christopher T. Schiller, Redding, CA (US)

(73) Assignee: GigPeak, Inc., San Jose, CA (US)

( * ) Notice: Subject to any disclaimer, the term of this patent is extended or adjusted under 35 U.S.C. 154(b) by 607 days.

(21) Appl. No.: 14/217,351

(22) Filed: Mar. 17, 2014

(65) Prior Publication Data
US 2014/0266894 A1   Sep. 18, 2014

Related U.S. Application Data

(60) Provisional application No. 61/801,765, filed on Mar. 15, 2013.

(51) Int. Cl.
*H01Q 3/00* (2006.01)
*H01Q 3/34* (2006.01)
(Continued)

(52) U.S. Cl.
CPC ............ *H01Q 3/34* (2013.01); *H01Q 3/2611* (2013.01); *G01S 19/21* (2013.01); *H01Q 3/22* (2013.01); *H01Q 3/2647* (2013.01)

(58) Field of Classification Search
CPC ...... H01Q 3/34; H01Q 3/2611; H01Q 3/2647; H01Q 3/22; H04W 16/28; G01S 19/21
(Continued)

(56) References Cited

U.S. PATENT DOCUMENTS

| 2,087,767 A | 7/1937 | Schermer |
| 2,349,976 A | 5/1944 | Hatsutaro |

(Continued)

FOREIGN PATENT DOCUMENTS

| CA | 2255347 A1 | 6/1999 |
| CA | 2340716 A1 | 3/2000 |

(Continued)

OTHER PUBLICATIONS

"An Analysis of Power Consumption in a Smartphone", NICTA, University of New South Wales, 2010 by Aaron Carroll, (pp. 14) https://www.usenix.org/legacy/event/usenix10/tech/full_papers/Carroll.pdf.

(Continued)

*Primary Examiner* — Chuong P Nguyen (57) ABSTRACT

A method includes pointing a receive beam of a retro-directive antenna array attracted to a jammer circuit instead of a remote transmitter away from the jammer circuit toward the remote transmitter by a first angle based on coarse manual means therefor implemented in electronic circuitry associated with the retro-directive antenna array. The electronic circuitry includes a number of mixers, each of which is configured to mix a Local Oscillator (LO) signal generated from a Voltage Controlled Oscillator (VCO) with a signal received at an antenna element of the retro-directive antenna array. The method also includes automatically fine pointing the receive beam toward the remote transmitter by a second angle following the coarse pointing thereof by the first angle such that the receive beam exactly points to, and tracks, the remote transmitter. The automatic fine pointing is effected through a secondary automatic servo loop implemented in the electronic circuitry.

20 Claims, 4 Drawing Sheets

---

402 — POINT A RECEIVE BEAM OF A RETRO-DIRECTIVE ANTENNA ARRAY ATTRACTED TO A JAMMER CIRCUIT INSTEAD OF A REMOTE TRANSMITTER AWAY FROM THE JAMMER CIRCUIT TOWARD THE REMOTE TRANSMITTER BY A FIRST ANGLE BASED ON COARSE MANUAL MEANS THEREFOR IMPLEMENTED IN ELECTRONIC CIRCUITRY ASSOCIATED WITH THE RETRO-DIRECTIVE ANTENNA ARRAY

404 — AUTOMATICALLY FINE POINT THE RECEIVE BEAM TOWARD THE REMOTE TRANSMITTER BY A SECOND ANGLE FOLLOWING THE COARSE POINTING THEREOF BY THE FIRST ANGLE SUCH THAT THE RECEIVE BEAM EXACTLY POINTS TO, AND TRACKS, THE REMOTE TRANSMITTER, THE AUTOMATIC FINE POINTING BEING EFFECTED THROUGH A SECONDARY AUTOMATIC SERVO LOOP IMPLEMENTED IN THE ELECTRONIC CIRCUITRY ASSOCIATED WITH THE RETRO-DIRECTIVE ANTENNA ARRAY (51) Int. Cl.
*H01Q 3/26* (2006.01)
*G01S 19/21* (2010.01)
*H01Q 3/22* (2006.01)

(58) Field of Classification Search
USPC .................. 342/357.59, 367–372; 455/63.4
See application file for complete search history.

(56) References Cited

U.S. PATENT DOCUMENTS

| | | | |
|---|---|---|---|
| 2,810,906 A | 10/1957 | Lynch | |
| 2,904,674 A | 9/1959 | Crawford | |
| 3,036,211 A | 5/1962 | Broadhead, Jr. et al. | |
| 3,193,767 A | 7/1965 | Schultz | |
| 3,305,864 A | 2/1967 | Ghose | |
| 3,328,714 A | 6/1967 | Hugenholtz | |
| 3,344,355 A | 9/1967 | Massman | |
| 3,422,436 A | 1/1969 | Marston | |
| 3,422,437 A | 1/1969 | Marston | |
| 3,433,960 A | 3/1969 | Minott | |
| 3,460,145 A | 8/1969 | Johnson | |
| 3,500,411 A | 3/1970 | Donald | |
| 3,619,786 A | 11/1971 | Wilcox | |
| 3,680,112 A | 7/1972 | Thomas | |
| 3,754,257 A | 8/1973 | Coleman | |
| 3,803,618 A | 4/1974 | Coleman | |
| 3,838,423 A | 9/1974 | Di Matteo | |
| 3,996,592 A | 12/1976 | Kline et al. | |
| 4,001,691 A | 1/1977 | Gruenberg | |
| 4,017,867 A | 4/1977 | Claus | |
| 4,032,922 A | 6/1977 | Provencher | |
| 4,090,199 A | 5/1978 | Archer | |
| 4,112,430 A | 9/1978 | Ladstatter | |
| 4,148,031 A | 4/1979 | Fletcher et al. | |
| 4,188,578 A | 2/1980 | Reudink et al. | |
| 4,189,733 A | 2/1980 | Malm | |
| 4,214,244 A | 7/1980 | McKay et al. | |
| 4,233,606 A | 11/1980 | Lovelace et al. | |
| 4,270,222 A | 5/1981 | Menant | |
| 4,277,787 A | 7/1981 | King | |
| 4,315,262 A | 2/1982 | Acampora et al. | |
| 4,404,563 A | 9/1983 | Richardson | |
| 4,532,519 A | 7/1985 | Rudish et al. | |
| 4,544,927 A | 10/1985 | Kurth et al. | |
| 4,566,013 A | 1/1986 | Steinberg et al. | |
| 4,649,373 A | 3/1987 | Bland et al. | |
| 4,688,045 A | 8/1987 | Knudsen | |
| 4,698,748 A | 10/1987 | Juzswik et al. | |
| 4,722,083 A | 1/1988 | Tirro et al. | |
| 4,736,463 A | 4/1988 | Chavez | |
| 4,743,783 A | 5/1988 | Isbell et al. | |
| 4,772,893 A | 9/1988 | Iwasaki | |
| 4,792,991 A | 12/1988 | Eness | |
| 4,806,938 A | 2/1989 | Meadows | |
| 4,827,268 A | 5/1989 | Rosen | |
| 4,882,589 A | 11/1989 | Reisenfeld | |
| 4,901,085 A | 2/1990 | Spring et al. | |
| 4,956,643 A | 9/1990 | Hahn, III et al. | |
| 4,965,602 A | 10/1990 | Kahrilas et al. | |
| 5,001,776 A | 3/1991 | Clark | |
| 5,012,254 A | 4/1991 | Thompson | |
| 5,027,126 A | 6/1991 | Basehgi et al. | |
| 5,028,931 A | 7/1991 | Ward | |
| 5,034,752 A | 7/1991 | Pourailly et al. | |
| 5,041,836 A | 8/1991 | Paschen et al. | |
| 5,084,708 A | 1/1992 | Champeau et al. | |
| 5,093,668 A | 3/1992 | Sreenivas | |
| 5,107,273 A * | 4/1992 | Roberts | H01Q 3/2611 342/375 |
| 5,128,687 A | 7/1992 | Fay | |
| 5,166,690 A | 11/1992 | Carlson et al. | |
| 5,173,701 A | 12/1992 | Dijkstra | |
| 5,179,724 A | 1/1993 | Lindoff | |
| 5,243,415 A | 9/1993 | Vance | |
| 5,274,836 A | 12/1993 | Lux | |
| 5,276,449 A | 1/1994 | Walsh | |
| 5,347,546 A | 9/1994 | Abadi et al. | |
| 5,349,688 A | 9/1994 | Nguyen | |
| 5,359,329 A | 10/1994 | Lewis et al. | |
| 5,369,771 A | 11/1994 | Gettel | |
| 5,375,146 A | 12/1994 | Chalmers | |
| 5,396,635 A | 3/1995 | Fung | |
| 5,408,668 A | 4/1995 | Tornai | |
| 5,434,578 A | 7/1995 | Stehlik | |
| 5,457,365 A | 10/1995 | Blagaila et al. | |
| 5,481,570 A | 1/1996 | Winters | |
| 5,486,726 A | 1/1996 | Kim et al. | |
| 5,497,162 A | 3/1996 | Kaiser | |
| 5,523,764 A * | 6/1996 | Martinez | H01Q 3/2605 342/372 |
| 5,539,415 A | 7/1996 | Metzen et al. | |
| 5,560,020 A | 9/1996 | Nakatani et al. | |
| 5,560,024 A | 9/1996 | Harper et al. | |
| 5,564,094 A | 10/1996 | Anderson et al. | |
| 5,583,511 A | 12/1996 | Hulderman | |
| 5,592,178 A | 1/1997 | Chang et al. | |
| 5,594,460 A | 1/1997 | Eguchi | |
| 5,617,572 A | 4/1997 | Pearce et al. | |
| 5,666,365 A | 9/1997 | Kostreski | |
| 5,697,081 A | 12/1997 | Lyall, Jr. et al. | |
| 5,710,929 A | 1/1998 | Fung | |
| 5,712,641 A | 1/1998 | Casabona et al. | |
| 5,748,048 A | 5/1998 | Moyal | |
| 5,754,138 A | 5/1998 | Turcotte et al. | |
| 5,787,294 A | 7/1998 | Evoy | |
| 5,790,070 A | 8/1998 | Natarajan et al. | |
| 5,799,199 A | 8/1998 | Ito et al. | |
| 5,822,597 A | 10/1998 | Kawano et al. | |
| 5,867,063 A | 2/1999 | Snider et al. | |
| 5,869,970 A | 2/1999 | Palm et al. | |
| 5,870,685 A | 2/1999 | Flynn | |
| 5,909,460 A | 6/1999 | Dent | |
| 5,952,965 A | 9/1999 | Kowalski | |
| 5,959,578 A | 9/1999 | Kreutel, Jr. | |
| 5,966,371 A | 10/1999 | Sherman | |
| 5,987,614 A | 11/1999 | Mitchell et al. | |
| 6,006,336 A | 12/1999 | Watts, Jr. et al. | |
| 6,009,124 A | 12/1999 | Smith et al. | |
| 6,026,285 A | 2/2000 | Lyall, Jr. et al. | |
| 6,061,385 A | 5/2000 | Ostman | |
| 6,079,025 A | 6/2000 | Fung | |
| 6,084,540 A | 7/2000 | Yu | |
| 6,111,816 A | 8/2000 | Chiang et al. | |
| 6,127,815 A | 10/2000 | Wilcox | |
| 6,127,971 A | 10/2000 | Calderbank et al. | |
| 6,144,705 A | 11/2000 | Papadopoulos et al. | |
| 6,166,689 A | 12/2000 | Dickey, Jr. et al. | |
| 6,167,286 A | 12/2000 | Ward et al. | |
| 6,169,522 B1 | 1/2001 | Ma et al. | |
| 6,175,719 B1 | 1/2001 | Sarraf et al. | |
| 6,272,317 B1 | 8/2001 | Houston et al. | |
| 6,298,221 B1 | 10/2001 | Nguyen | |
| 6,317,411 B1 | 11/2001 | Whinnett et al. | |
| 6,320,896 B1 | 11/2001 | Jovanovich et al. | |
| 6,336,030 B2 | 1/2002 | Houston | |
| 6,397,090 B1 | 5/2002 | Cho | |
| 6,463,295 B1 | 10/2002 | Yun | |
| 6,473,016 B2 | 10/2002 | Piirainen et al. | |
| 6,473,037 B2 | 10/2002 | Vail et al. | |
| 6,480,522 B1 | 11/2002 | Hoole et al. | |
| 6,501,415 B1 | 12/2002 | Viana et al. | |
| 6,509,865 B2 | 1/2003 | Takai | |
| 6,523,123 B1 | 2/2003 | Barbee | |
| 6,529,162 B2 | 3/2003 | Newberg et al. | |
| 6,531,976 B1 * | 3/2003 | Yu | G01S 7/2813 342/128 |
| 6,587,077 B2 | 7/2003 | Vail et al. | |
| 6,598,009 B2 | 7/2003 | Yang | |
| 6,630,905 B1 | 10/2003 | Newberg et al. | |
| 6,646,599 B1 | 11/2003 | Apa et al. | |
| 6,653,969 B1 | 11/2003 | Birleson | |
| 6,661,366 B2 | 12/2003 | Yu | |
| 6,661,375 B2 | 12/2003 | Rickett et al. | |
| 6,671,227 B2 | 12/2003 | Gilbert et al. | |
| 6,697,953 B1 | 2/2004 | Collins | |

(56) References Cited

U.S. PATENT DOCUMENTS

| | | | |
|---|---|---|---|
| 6,704,557 B1 * | 3/2004 | Krishnamurthy | H01Q 3/2611 342/368 |
| 6,707,419 B2 | 3/2004 | Woodington et al. | |
| 6,768,456 B1 | 7/2004 | Lalezari et al. | |
| 6,771,220 B1 | 8/2004 | Ashe et al. | |
| 6,778,137 B2 | 8/2004 | Krikorian et al. | |
| 6,788,250 B2 | 9/2004 | Howell | |
| 6,816,977 B2 | 11/2004 | Brakmo et al. | |
| 6,822,522 B1 | 11/2004 | Brown et al. | |
| 6,833,766 B2 | 12/2004 | Kim et al. | |
| 6,870,503 B2 | 3/2005 | Mohamadi | |
| 6,873,289 B2 * | 3/2005 | Kwon | H01Q 3/01 342/372 |
| 6,885,974 B2 | 4/2005 | Holle | |
| 6,947,775 B2 | 9/2005 | Okamoto et al. | |
| 6,960,962 B2 | 11/2005 | Peterzell et al. | |
| 6,977,610 B2 | 12/2005 | Brookner et al. | |
| 6,980,786 B1 | 12/2005 | Groe | |
| 6,989,787 B2 | 1/2006 | Park et al. | |
| 6,992,992 B1 | 1/2006 | Cooper et al. | |
| 7,006,039 B2 | 2/2006 | Miyamoto et al. | |
| 7,010,330 B1 | 3/2006 | Tsividis | |
| 7,013,165 B2 | 3/2006 | Yoon et al. | |
| 7,016,654 B1 | 3/2006 | Bugeja | |
| 7,035,613 B2 | 4/2006 | Dubash et al. | |
| 7,039,442 B1 | 5/2006 | Joham et al. | |
| 7,062,302 B2 | 6/2006 | Yamaoka | |
| 7,103,383 B2 | 9/2006 | Ito | |
| 7,109,918 B1 | 9/2006 | Meadows et al. | |
| 7,109,919 B2 | 9/2006 | Howell | |
| 7,110,732 B2 | 9/2006 | Mostafa et al. | |
| 7,126,542 B2 | 10/2006 | Mohamadi | |
| 7,126,554 B2 | 10/2006 | Mohamadi | |
| 7,154,346 B2 | 12/2006 | Jaffe et al. | |
| 7,196,590 B1 | 3/2007 | In et al. | |
| 7,245,269 B2 | 7/2007 | Sievenpiper et al. | |
| 7,304,607 B2 | 12/2007 | Miyamoto et al. | |
| 7,312,750 B2 | 12/2007 | Mao et al. | |
| 7,327,313 B2 | 2/2008 | Hemmi et al. | |
| 7,340,623 B2 | 3/2008 | Kato et al. | |
| 7,379,515 B2 | 5/2008 | Johnson et al. | |
| 7,382,202 B2 | 6/2008 | Jaffe et al. | |
| 7,382,314 B2 | 6/2008 | Liao et al. | |
| 7,382,743 B1 | 6/2008 | Rao et al. | |
| 7,421,591 B2 | 9/2008 | Sultenfuss et al. | |
| 7,440,766 B1 | 10/2008 | Tuovinen et al. | |
| 7,463,191 B2 | 12/2008 | Dybdal et al. | |
| 7,482,975 B2 | 1/2009 | Kimata | |
| 7,501,959 B2 | 3/2009 | Shirakawa | |
| 7,508,950 B2 | 3/2009 | Danielsen | |
| 7,522,885 B2 | 4/2009 | Parssinen et al. | |
| 7,529,443 B2 | 5/2009 | Holmstrom et al. | |
| 7,558,548 B2 | 7/2009 | Konchistky | |
| 7,570,124 B2 | 8/2009 | Haralabidis | |
| 7,574,617 B2 | 8/2009 | Park | |
| 7,620,382 B2 | 11/2009 | Yamamoto | |
| 7,663,546 B1 | 2/2010 | Miyamoto et al. | |
| 7,664,533 B2 | 2/2010 | Logothetis et al. | |
| 7,710,319 B2 | 5/2010 | Nassiri-Toussi et al. | |
| 7,728,769 B2 | 6/2010 | Chang et al. | |
| 7,742,000 B2 | 6/2010 | Mohamadi | |
| 7,760,122 B1 | 7/2010 | Zortea | |
| 7,812,775 B2 | 10/2010 | Babakhani et al. | |
| 7,848,719 B2 | 12/2010 | Krishnaswamy et al. | |
| 7,861,098 B2 | 12/2010 | Theocharous et al. | |
| 7,912,517 B2 | 3/2011 | Park | |
| 7,925,208 B2 | 4/2011 | Sarraf et al. | |
| 7,934,107 B2 | 4/2011 | Walrath | |
| 7,944,396 B2 | 5/2011 | Brown et al. | |
| 7,979,049 B2 | 7/2011 | Oredsson et al. | |
| 7,982,651 B1 | 7/2011 | Zortea | |
| 7,982,669 B2 | 7/2011 | Nassiri-Toussi et al. | |
| 7,991,437 B2 | 8/2011 | Camuffo et al. | |
| 8,005,437 B2 | 8/2011 | Rofougaran | |
| 8,031,019 B2 | 10/2011 | Chawla et al. | |
| 8,036,164 B1 | 10/2011 | Winters et al. | |
| 8,036,719 B2 | 10/2011 | Ying | |
| 8,063,996 B2 | 11/2011 | Du Val et al. | |
| 8,072,380 B2 | 12/2011 | Crouch | |
| 8,078,110 B2 | 12/2011 | Li et al. | |
| 8,102,313 B2 | 1/2012 | Guenther et al. | |
| 8,112,646 B2 | 2/2012 | Tsai | |
| 8,126,417 B2 | 2/2012 | Saito | |
| 8,138,841 B2 | 3/2012 | Wan et al. | |
| 8,156,353 B2 | 4/2012 | Tsai | |
| 8,165,185 B2 | 4/2012 | Zhang et al. | |
| 8,165,543 B2 | 4/2012 | Rohit et al. | |
| 8,170,503 B2 | 5/2012 | Oh et al. | |
| 8,174,328 B2 | 5/2012 | Park et al. | |
| 8,184,052 B1 | 5/2012 | Wu et al. | |
| 8,222,933 B2 | 7/2012 | Nagaraj | |
| 8,248,203 B2 | 8/2012 | Hanwright et al. | |
| 8,265,646 B2 | 9/2012 | Agarwal | |
| 8,290,020 B2 | 10/2012 | Liu et al. | |
| 8,305,190 B2 | 11/2012 | Moshfeghi | |
| 8,325,089 B2 | 12/2012 | Rofougaran | |
| 8,340,015 B1 | 12/2012 | Miller et al. | |
| 8,344,943 B2 | 1/2013 | Brown et al. | |
| 8,373,510 B2 | 2/2013 | Kelkar | |
| 8,396,107 B2 | 3/2013 | Gaur | |
| 8,400,356 B2 | 3/2013 | Paynter | |
| 8,417,191 B2 | 4/2013 | Xia et al. | |
| 8,428,535 B1 | 4/2013 | Cousinard et al. | |
| 8,432,805 B2 | 4/2013 | Agarwal | |
| 8,446,317 B1 | 5/2013 | Wu et al. | |
| 8,456,244 B2 | 6/2013 | Obkircher et al. | |
| 8,466,776 B2 | 6/2013 | Fink et al. | |
| 8,466,832 B2 | 6/2013 | Afshari et al. | |
| 8,472,884 B2 | 6/2013 | Ginsburg et al. | |
| 8,509,144 B2 | 8/2013 | Miller et al. | |
| 8,542,629 B2 | 9/2013 | Miller | |
| 8,558,625 B1 | 10/2013 | Lie et al. | |
| 8,565,358 B2 | 10/2013 | Komaili et al. | |
| 8,571,127 B2 | 10/2013 | Jiang et al. | |
| 8,604,976 B1 | 12/2013 | Chang et al. | |
| 8,644,780 B2 | 2/2014 | Tohoku | |
| 8,654,262 B2 | 2/2014 | Du Val et al. | |
| 8,660,497 B1 | 2/2014 | Zhang et al. | |
| 8,660,500 B2 | 2/2014 | Rofougaran et al. | |
| 8,700,923 B2 | 4/2014 | Fung | |
| 8,761,755 B2 | 6/2014 | Karaoguz | |
| 8,762,751 B2 | 6/2014 | Rodriguez et al. | |
| 8,781,426 B2 | 7/2014 | Ciccarelli et al. | |
| 8,786,376 B2 | 7/2014 | Voinigescu et al. | |
| 8,788,103 B2 | 7/2014 | Warren | |
| 8,792,896 B2 | 7/2014 | Ahmad et al. | |
| 8,797,212 B1 | 8/2014 | Wu et al. | |
| 8,805,275 B2 | 8/2014 | O'Neill et al. | |
| 8,832,468 B2 | 9/2014 | Pop et al. | |
| 8,843,094 B2 | 9/2014 | Ahmed et al. | |
| 9,288,007 B2 * | 3/2016 | Jover | H04K 3/224 |
| 2001/0038318 A1 | 11/2001 | Johnson et al. | |
| 2002/0084934 A1 | 7/2002 | Vail et al. | |
| 2002/0159403 A1 | 10/2002 | Reddy | |
| 2002/0175859 A1 | 11/2002 | Newberg et al. | |
| 2002/0177475 A1 | 11/2002 | Park | |
| 2002/0180639 A1 | 12/2002 | Rickett et al. | |
| 2003/0003887 A1 | 1/2003 | Lim et al. | |
| 2003/0034916 A1 | 2/2003 | Kwon et al. | |
| 2004/0043745 A1 | 3/2004 | Najarian et al. | |
| 2004/0095287 A1 | 5/2004 | Mohamadi | |
| 2004/0166801 A1 | 8/2004 | Sharon et al. | |
| 2004/0192376 A1 | 9/2004 | Grybos | |
| 2004/0263408 A1 | 12/2004 | Sievenpiper et al. | |
| 2005/0012667 A1 | 1/2005 | Noujeim | |
| 2005/0030226 A1 | 2/2005 | Miyamoto et al. | |
| 2005/0116864 A1 | 6/2005 | Mohamadi | |
| 2005/0117720 A1 | 6/2005 | Goodman et al. | |
| 2005/0197060 A1 | 9/2005 | Hedinger et al. | |
| 2005/0206564 A1 | 9/2005 | Mao et al. | |
| 2005/0208919 A1 | 9/2005 | Walker et al. | |
| 2005/0215274 A1 | 9/2005 | Matson et al. | |
| 2006/0003722 A1 | 1/2006 | Tuttle et al. | |
| 2006/0063490 A1 | 3/2006 | Bader et al. | |

(56) References Cited

U.S. PATENT DOCUMENTS

| | | |
|---|---|---|
| 2006/0153320 A1* | 7/2006 | Gruber .................. H04L 1/02 375/347 |
| 2006/0262013 A1 | 11/2006 | Shiroma et al. |
| 2006/0281430 A1 | 12/2006 | Yamamoto |
| 2007/0047669 A1 | 3/2007 | Mak et al. |
| 2007/0098320 A1 | 5/2007 | Holmstrom et al. |
| 2007/0099588 A1 | 5/2007 | Konchistky |
| 2007/0123186 A1 | 5/2007 | Asayama et al. |
| 2007/0135051 A1 | 6/2007 | Zheng et al. |
| 2007/0142089 A1 | 6/2007 | Roy |
| 2007/0173286 A1 | 7/2007 | Carter et al. |
| 2007/0298742 A1 | 12/2007 | Ketchum et al. |
| 2008/0001812 A1 | 1/2008 | Jalali |
| 2008/0039042 A1 | 2/2008 | Ciccarelli et al. |
| 2008/0045153 A1 | 2/2008 | Surineni et al. |
| 2008/0063012 A1 | 3/2008 | Nakao et al. |
| 2008/0075058 A1 | 3/2008 | Mundarath et al. |
| 2008/0091965 A1 | 4/2008 | Nychka et al. |
| 2008/0129393 A1 | 6/2008 | Rangan et al. |
| 2008/0218429 A1 | 9/2008 | Johnson et al. |
| 2008/0233865 A1 | 9/2008 | Malarky et al. |
| 2008/0240031 A1 | 10/2008 | Nassiri-Toussi et al. |
| 2009/0023384 A1 | 1/2009 | Miller |
| 2009/0143038 A1 | 6/2009 | Saito |
| 2009/0153253 A1 | 6/2009 | Mei |
| 2009/0160707 A1 | 6/2009 | Lakkis |
| 2009/0286482 A1 | 11/2009 | Gorokhov et al. |
| 2010/0100751 A1 | 4/2010 | Guo et al. |
| 2010/0259447 A1 | 10/2010 | Crouch |
| 2010/0302980 A1 | 12/2010 | Ji et al. |
| 2011/0084879 A1 | 4/2011 | Brown et al. |
| 2011/0095794 A1 | 4/2011 | Dubost et al. |
| 2011/0140746 A1 | 6/2011 | Park et al. |
| 2011/0188597 A1 | 8/2011 | Agee et al. |
| 2011/0221396 A1 | 9/2011 | Glauning |
| 2011/0235748 A1 | 9/2011 | Kenington |
| 2011/0273210 A1 | 11/2011 | Nagaraj |
| 2011/0285593 A1 | 11/2011 | Cavirani et al. |
| 2012/0004005 A1 | 1/2012 | Ahmed et al. |
| 2012/0013507 A1 | 1/2012 | Fusco |
| 2012/0026970 A1 | 2/2012 | Winters et al. |
| 2012/0092211 A1 | 4/2012 | Hampel et al. |
| 2012/0190378 A1 | 7/2012 | Han et al. |
| 2012/0200327 A1 | 8/2012 | Sreekiran et al. |
| 2012/0235716 A1 | 9/2012 | Dubost et al. |
| 2012/0235857 A1 | 9/2012 | Kim et al. |
| 2012/0280730 A1 | 11/2012 | Obkircher et al. |
| 2012/0284543 A1 | 11/2012 | Xian et al. |
| 2012/0319734 A1 | 12/2012 | Nagaraj et al. |
| 2013/0002472 A1 | 1/2013 | Crouch |
| 2013/0039348 A1 | 2/2013 | Hu et al. |
| 2013/0047017 A1 | 2/2013 | Lin et al. |
| 2013/0095873 A1 | 4/2013 | Soriaga et al. |
| 2013/0154695 A1 | 6/2013 | Abbasi et al. |
| 2013/0176171 A1 | 7/2013 | Webber et al. |
| 2013/0234889 A1 | 9/2013 | Hwang et al. |
| 2013/0241612 A1 | 9/2013 | Obkircher et al. |
| 2013/0322197 A1 | 12/2013 | Schiller et al. |
| 2013/0339764 A1 | 12/2013 | Lee et al. |
| 2014/0035783 A1* | 2/2014 | Contarino .............. G01S 19/21 342/357.59 |
| 2014/0085011 A1 | 3/2014 | Choi et al. |
| 2014/0097986 A1 | 4/2014 | Xue et al. |
| 2014/0120845 A1 | 5/2014 | Laskar |
| 2014/0120848 A1 | 5/2014 | Laskar |
| 2014/0266471 A1 | 9/2014 | Zhu et al. |
| 2014/0266889 A1 | 9/2014 | Schiller |
| 2014/0266890 A1 | 9/2014 | Schiller et al. |
| 2014/0266891 A1* | 9/2014 | Schiller ................ H01Q 3/42 342/367 |
| 2014/0266892 A1 | 9/2014 | Schiller |
| 2014/0266893 A1* | 9/2014 | Rasheed ................ H01Q 3/34 342/367 |
| 2014/0266894 A1 | 9/2014 | Rasheed et al. |
| 2014/0273817 A1 | 9/2014 | Schiller |
| 2015/0138992 A1* | 5/2015 | Jover .................. H04K 3/224 370/244 |

FOREIGN PATENT DOCUMENTS

| | | |
|---|---|---|
| EP | 0305099 A2 | 3/1989 |
| EP | 0754355 B1 | 6/2000 |
| EP | 1047216 A2 | 10/2000 |
| EP | 1261064 A1 | 11/2002 |
| EP | 1267444 A2 | 12/2002 |
| EP | 1672468 A2 | 6/2006 |
| EP | 2003799 A1 | 12/2008 |
| EP | 2151924 A1 | 2/2010 |
| EP | 2456079 A2 | 5/2012 |
| WO | 8601057 A1 | 2/1986 |
| WO | 8706072 A1 | 10/1987 |
| WO | 9107024 A1 | 5/1991 |
| WO | 9414178 A1 | 6/1994 |
| WO | 9721284 A1 | 6/1997 |
| WO | 9832245 A1 | 7/1998 |
| WO | 9916221 A1 | 4/1999 |
| WO | 0051202 A1 | 8/2000 |
| WO | 0055986 A1 | 9/2000 |
| WO | 0074170 A2 | 12/2000 |
| WO | 0117065 A1 | 3/2001 |
| WO | 0198839 A2 | 12/2001 |
| WO | 03023438 A2 | 3/2003 |
| WO | 03038513 A2 | 5/2003 |
| WO | 03041283 A2 | 5/2003 |
| WO | 03079043 A2 | 9/2003 |
| WO | 2004021541 A1 | 3/2004 |
| WO | 2004082197 A2 | 9/2004 |
| WO | 2006133225 A2 | 12/2006 |
| WO | 2007130442 A2 | 11/2007 |
| WO | 2010024539 A2 | 3/2010 |
| WO | 2010073241 A2 | 7/2010 |
| WO | 2011008146 A1 | 1/2011 |
| WO | 2012033509 A1 | 3/2012 |
| WO | 2014057329 A2 | 4/2014 |
| WO | 2014150615 A1 | 9/2014 |
| WO | 2014151933 A2 | 9/2014 |

OTHER PUBLICATIONS

"Standby Consumption in Households State of the Art and Possibilities for Reduction for Home Electronics", Delft, The Netherlands (pp. 8) http://standby.lbl.gov/pdf/siderius.html.

"Wake on Wireless: An Event Driven Energy Saving Strategy for Battery Operated Devices", Massachusetts Institute of Technology Cambridge, 2002 by Eugene Shih et al. (pp. 12) http://research.microsoft.com/en-us/um/people/bahl/Papers/Pdf/mobicom02.pdf.

"Reducing Leaking Electricity to 1 Watt" National Laboratory, Berkeley, CA, Aug. 28, 1998 by Alan Meier et al. (pp. 10) http://standby.lbl.gov/pdf/42108.html.

"Reducing Power in High-performance Microprocessors", Intel Corporation,Santa Clara CA. 1998 by Vivek Tiwari et al. (p. 1) http://dl.acm.org/citation.cfm?id=277227.

"Simulating the Power Consumption of Large-Scale Sensor Network Applications", Division of Engineering and Applied Sciences,Harvard University, by Victor Shnayder et al. (pp. 13) http://web.stanford.edu/class/cs344a/papers/sensys04ptossim.pdf.

"Distributed Transmit Beamforming:Challenges and Recent Progress", University of California at Santa Barbara, 2009 by Raghuraman Mudumbai et al. (pp. 9) http://spinlab.wpi.edu/pubs/Mudumbai_COMMAG_2009.pdf.

"Design and Simulation of a Low Cost Digital Beamforming (DBF) Receiver for Wireless Communication",International Journal of Innovative Technology and Exploring Engineering (IJITEE), vol. 2, Jan. 2, 2013 by V.N. Okorogu (pp. 8) http://www.ijitee.org/attachments/File/v2i2/B0351012213.pdf.

"Frequency multiplication techniques for Sub-harmonic injection locking of LC oscillators and Its application to phased-array architectures", Ottawa-Carleton Institute for Electrical and Computer (56) References Cited

OTHER PUBLICATIONS

Engineering, 2013 by Yasser Khairat Soliman (pp. 2) https://curve.carleton.ca/system/files/theses/27532.pdf.
"Active Integrated Antennas", Transactions on microwave theory and techniques, vol. No. 50, No. 3, Mar. 2002, by Kai Chang et al. (pp. 8) http://www.cco.caltech.edu/~mmic/reshpubindex/MURI/MURI03/York2.pdf.
"Low cost and compact active integrated antenna transceiver for system applications", Dept. of Electronics Engineers, Texas A&M University, College Station, Texas, USA, Oct. 1996 by R.A. Flynt et al. (p. 1) http://ieeexplore.ieee.org/xpl/login.jsp?tp=&arnumber=538955&url=http%3A%2F%2Fieeexplore.ieee.org%2Fxpls%2Fabs_all.jsp%3Farnumber%3D538955.
"Phased array and adaptive antenna transceivers in wireless sensor networks", Institute of Microsystem Technology—IMTEK, Albert-Ludwig-University, Freiburg, Germany, 2004 by Ruimin Huang et al. (pp. 1) http://ieeexplore.ieee.org/xpl/login.jsp?tp=&arnumber=1333329&url=http%3A%2F%2Fieeexplore.ieee.org%2Fxpls%2Fabs_all.jsp%3Farnumber%3D1333329.
"A mixed-signal sensor interface microinstrument", Sensors and Actuators A: Physical, Science Direct, vol. 91, Issue 3, Jul. 15, 2001 by Keith L. Kraver et al. (p. 2) http://www.sciencedirect.com/science/article/pii/S0924424701005969.
"On the Feasibility of Distributed Beamforming in Wireless Networks", IEEE transactions on wireless communications, vol. 6,No. 5, May 2007 by R. Mudumbai. (pp. 10) https://research.engineering.uiowa.edu/wrl/sites/research.engineering.uiowa.edu.wrl/files/attachments/TWICOM07_0.pdf.
"Antenna Systems for Radar Applications Information Technology Essay", (pp. 15) http://www.ukessays.com/essays/information-technology/antenna-systems-for-radar-applications-information-technology-essay.php.
"Smart antennas control circuits for automotive communications", Mar. 28, 2012, by David Cordeau et al. (pp. 10) https://hal.archives-ouvertes.fr/file/index/docid/683344/filename/Cordeau_Paillot.pdf.
"Adaptive Beam Steering of RLSA Antenna With RFID Technonlogy", Progress in Electromagnetics Research, vol. 108, Jul. 19, 2010 by M. F. Jamlos et al. (pp. 16) http://jpier.org/PIER/pier108/05.10071903.pdf.
"Retrodirective arrays for wireless communications", Microwave Magzine, IEEE Xplore, vol. 3,Issue 1, Mar. 2002 by R.Y. Miyamoto et al. (p. 1) http://ieeexplore.ieee.org/xpl/login.jsp?tp=&arnumber=990692&url=http%3A%2F%2Fieeexplore.ieee.org%2Fxpls%2Fabs_all.jsp%3Farnumber%3D990692.
"An Active Integrated Retrodirective Transponder for Remote Information Retrieval-on-Demand", IEEE Transactions on Microwave Theory and Techniques, vol. 49, No. 9, Sep. 2001 by Ryan Y. Miyamoto et al. (pp. 5) http://www.mwlab.ee.ucla.edu/publications/2001c/mtt_trans/d.pdf.
"Ongoing retro directive Array Research at UCLA", The Institute of electrical Information and communication Engineers, by Kevin M.K.H. Leong et al. (pp. 6) http://www.ieice.org/~wpt/paper/SPS02-08.pdf.
"Digital communications using self-phased arrays", Jet Propulsion Lab., California Inst. of Technology, Pasadena, CA, USA, IEEE Xplore, vol. 49, Issue 4, Apr. 2001 by L.D. DiDomenico et al. (p. 1) http://ieeexplore.ieee.org/xpl/login.jsp?tp=&arnumber=915442&url=http%3A%2F%2Fieeexplore.ieee.org%2Fxpls%2Fabs_all.jsp%3Farnumber%3D915442.
"Large Active Retrodirective Arrays for Space Applications", NASA Technical Documents, Jan. 15, 1978 by R. C Chernoff (p. 1) https://archive.org/details/nasa_techdoc_19780013390.
"Beam Steering in Smart Antennas by Using Low Complex Adaptive Algorithms", International Journal of Research in Engineering and Technology, vol. 02 Issue: 10, Oct. 2013 by Amarnadh Poluri et al. (pp. 7) http://ijret.org/Volumes/V02/I10/IJRET_110210085.pdf.
"Efficient Adaptive Beam Steering Using INLMS Algorithm for Smart Antenna", ECE Department, QIS College of Engineering and Technology, Ongole, India, Jul. 22, 2012 by E. Anji Naik et al. (pp. 5) http://www.irnetexplore.ac.in/IRNetExplore_Proceedings/Vijayawada/AEEE/AEEE_22ndJuly2012/AEEE_22ndJuly2012_doc/paper3.pdf.
"A Primer on Digital Beamforming", Mar. 26, 1998 by Toby Haynes (pp. 15) http://www.spectrumsignal.com/publications/beamform_primer.pdf.
"Design of Beam Steering Antenna Array for RFID Reader Using Fully Controlled RF Switches", Mobile and Satellite Communications Research Centre University of Bradford by D. Zhou et al. (pp. 7).
"Electronically steerable passive array radiator antennas for low-cost analog adaptive beamforming", ATR Adaptive Commun. Res. Labs., Kyoto, Japan, IEEE Xplore, 2000 by T. Ohira et al. (p. 1) http://ieeexplore.ieee.org/xpl/articleDetails.jsp?tp=&arnumber=858918&url=http%3A%2F%2Fieeexplore.ieee.org%2Fxpls%2Fabs_all.jsp%3Farnumber%3D858918.
"Sector-mode beamforming of a 2.4-GHz electronically steerable passive array radiator antenna for a wireless ad hoc network", ATR Adaptive Commun. Res. Labs., Kyoto, Japan, IEEE Xplore, 2002 by Jun Cheng et al. (p. 1) http://ieeexplore.ieee.org/xpl/articleDetails.jsp?arnumber=1016265.
"Design of electronically steerable passive array radiator (ESPAR) antennas", ATR Adaptive Commun. Res. Lab., Kyoto, Japan, IEEE Xplore, 2000 by K. Gyoda et al. (p. 1) http://ieeexplore.ieee.org/xpl/articleDetails.jsp?arnumber=875370.
"A low complex adaptive algorithm for antenna beam steering", Dept. of Electron. & Communication Engineering, Narasaraopeta Eng. Collage, Narasaraopeta, India, IEEE Xplore, 2011 by M.Z.U. Rahman et al. (p. 1) http://ieeexplore.ieee.org/xpl/login.jsp?tp=&arnumber=6024567&url=http%3A%2F%2Fieeexplore.ieee.org%2Fxpls%2Fabs_all.jsp%3Farnumber%3D6024567.
"Receiver Front-End Architectures—Analysis and Evaluation", Mar. 1, 2010 by Pedro Cruz et al. (pp. 27) http://cdn.intechopen.com/pdfs-wm/9961.pdf.
"An injection-locking scheme for precision quadrature generation", CeLight Inc., Iselin, NJ, USA, Solid-State Circuits, IEEE Xplore, vol. 37, Issue 7, Jul. 2002 by P. Kinget et al. (p. 1) http://ieeexplore.ieee.org/xpl/login.jsp?tp=&arnumber=1015681&url=http%3A%2F%2Fieeexplore.ieee.org%2Fxpls%2Fabs_all.jsp%3Farnumber%3D1015681.
"The Fundamentals of Signal Generation", Agilent Technologies, Electronic Design, Jan. 24, 2013 by Erik Diez (pp. 12) http://electronicdesign.com/test-amp-measurement/fundamentals-signal-generation.

* cited by examiner

FIGURE 4

AUTOMATIC HIGH-RESOLUTION ADAPTIVE BEAM-STEERING

CLAIM OF PRIORITY

This application is a conversion application of the U.S. provisional patent application No. 61/801,765 titled AUTOMATIC HIGH-RESOLUTION ADAPTIVE BEAM-STEERING filed on Mar. 15, 2013.

FIELD OF TECHNOLOGY

This disclosure generally relates to beam-steering and, more specifically, to a method, a circuit and/or a system of automatic high-resolution adaptive beam-steering.

BACKGROUND

Modern systems such as wireless, phased array, communication, radar, Global Positioning System (GPS) and signal gathering systems may require control and/or maintenance of direction of a beam. The aforementioned systems may require costly physical alignment of antenna systems thereof; in the case of electronic beam-steering antenna systems, a high level of circuit and processing complexity may be required, in addition to constant monitoring.

A servo system utilized to determine the direction of a remote transmitter and then to transmit Radio Frequency (RF) signals back at the remote transmitter may require complete down-conversion and digital signal processing, which are time consuming and costly in terms of circuitry and power. Moreover, such a system may be sensitive to jamming from unwanted transmitters.

SUMMARY

Disclosed are a method, a circuit and/or a system of automatic high-resolution adaptive beam-steering.

In one aspect, a method includes pointing a receive beam of a retro-directive antenna array including a number of antenna elements attracted to a jammer circuit instead of a remote transmitter away from the jammer circuit toward the remote transmitter by a first angle based on coarse manual means therefor implemented in electronic circuitry associated with the retro-directive antenna array. The electronic circuitry includes a number of mixers, each of which is configured to mix a Local Oscillator (LO) signal generated from a Voltage Controlled Oscillator (VCO) of a coupled VCO array including a number of VCOs with a signal received at an antenna element.

The method also includes automatically fine pointing the receive beam toward the remote transmitter by a second angle following the coarse pointing thereof by the first angle such that the receive beam exactly points to, and tracks, the remote transmitter. The automatic fine pointing is effected through a secondary automatic servo loop implemented in the electronic circuitry associated with the retro-directive antenna array.

In another aspect, a beam-steering system includes a retro-directive antenna array including a number of antenna elements. A receive beam of the retro-directive antenna array is attracted to a jammer circuit instead of a remote transmitter. The beam-steering system also includes coarse manual means implemented in electronic circuitry associated with the retro-directive antenna array for pointing the receive beam away from the jammer circuit toward the remote transmitter by a first angle. The electronic circuitry includes a number of mixers, each of which is configured to mix a LO signal generated from a VCO of a coupled VCO array including a number of VCOs with a signal received at an antenna element.

The beam-steering system further includes a secondary automatic servo loop implemented in the electronic circuitry associated with the retro-directive antenna array for automatic fine pointing of the receive beam toward the remote transmitter by a second angle following the coarse pointing thereof by the first angle such that the receive beam exactly points to, and tracks, the remote transmitter.

In yet another aspect, a wireless communication system includes a remote transmitter, a jammer circuit and a beam-steering system. The beam-steering system includes a retro-directive antenna array including a number of antenna elements. A receive beam of the retro-directive antenna array is attracted to the jammer circuit instead of the remote transmitter. The beam-steering system also includes coarse manual means implemented in electronic circuitry associated with the retro-directive antenna array for pointing the receive beam away from the jammer circuit toward the remote transmitter by a first angle. The electronic circuitry includes a number of mixers, each of which is configured to mix a LO signal generated from a VCO of a coupled VCO array including a number of VCOs with a signal received at an antenna element.

The beam-steering system further includes a secondary automatic servo loop implemented in the electronic circuitry associated with the retro-directive antenna array for automatic fine pointing of the receive beam toward the remote transmitter by a second angle following the coarse pointing thereof by the first angle such that the receive beam exactly points to, and tracks, the remote transmitter.

Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the disclosure that follows.

DETAILED DESCRIPTION

Example embodiments, as described below, may be used to provide a method, a circuit and/or a system of automatic high-resolution adaptive beam-steering. Although the present embodiments have been described with reference to specific example embodiments, it will be evident that various modifications and changes may be made to these embodiments without departing from the broader spirit and scope of the various embodiments.

Beamforming may be a technique for electronically setting a direction of a Radio Frequency (RF) beam using fixed arrays of antenna apertures or antenna elements. The aforementioned antenna arrays may be one-dimensional, two-dimensional or three-dimensional. The electronic pointing of the RF beam may be performed for either transmission or reception of signals. Beamforming, or electronic direction setting of the RF beam, may typically be achieved through the introduction of differential phase shifts in signal paths coupled to each of the antenna apertures or antenna elements.

It should be noted that exemplary embodiments to be discussed herein are to be placed within the context of a receiver (e.g., wireless receiver), where Local Oscillator (LO) signal generation is required.

Figure 1:
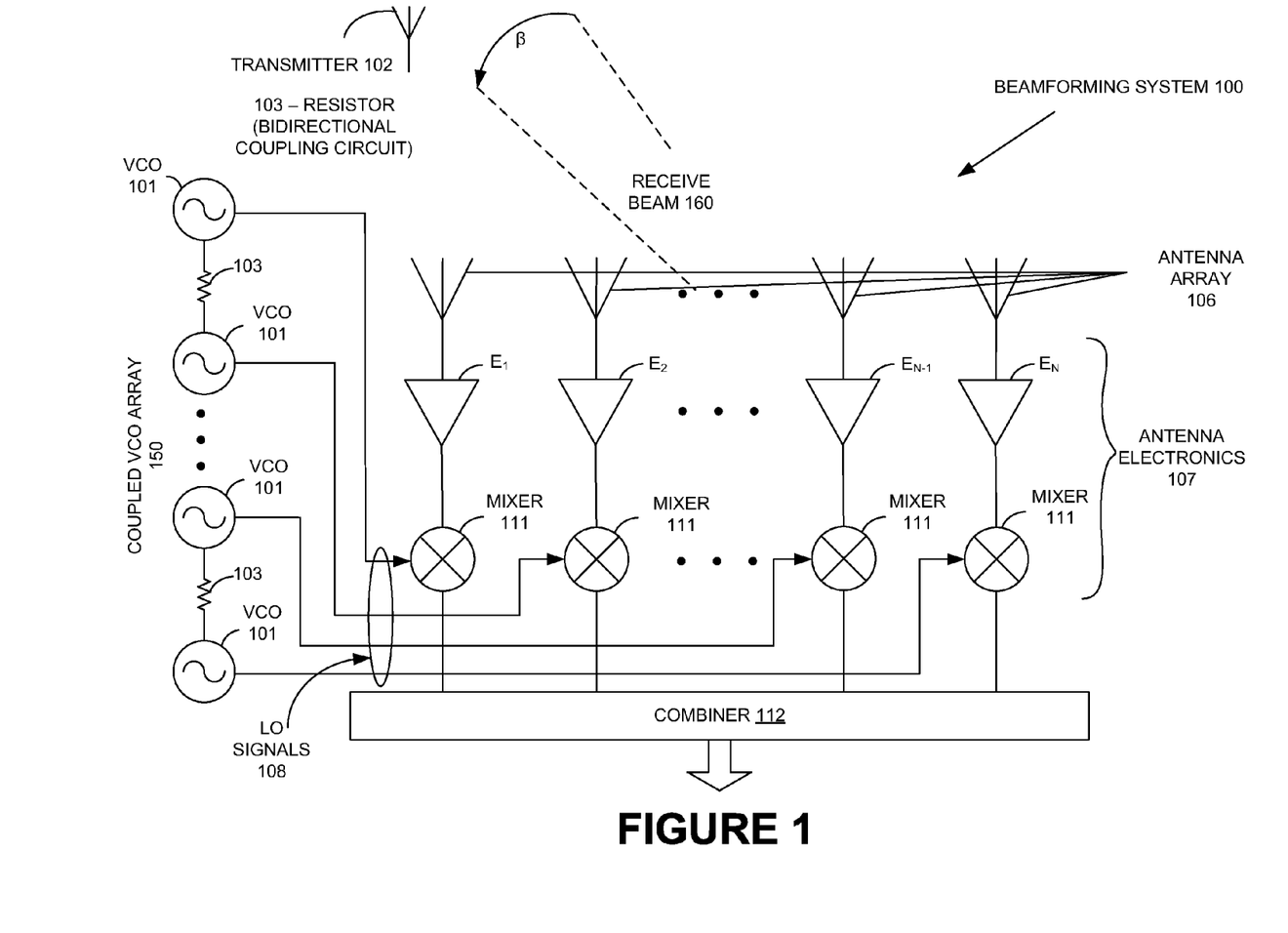
FIG. 1 is a schematic view of a beamforming system involving Local Oscillator (LO) scanned arrays.

A common technique to introduce the requisite phase shift in the signal path may involve generation of LO signals to mixers located in the signal paths. The aforementioned configuration may be called an LO scanned array. FIG. 1 shows a beamforming system 100 involving LO scanned arrays; LO scanned arrays may also be utilized to sense the direction from which a transmitter 102 is radiating energy. The antenna system including antenna array 106 and antenna electronics 107 may be utilized to reflect back the incident RF radiation in the direction of the source transmitter 102. The aforementioned antenna array 106 may be called a retro-directive array. FIG. 1 shows the automatic adaptive alignment of the receive beam (e.g., receive beam 160) toward the direction (e.g., through rotating an angle β) of the transmitted RF signal.

In the LO scanned arrays of FIG. 1, LO signals 108 with differential phases may be generated, and the differential phase LO signals 108 may be input to mixers 111 located in the signal paths. Antenna array 106 may be utilized in beam-steering or directing and/or focusing of transmitted/received signals. By directing the energy from or concentrating the energy incoming thereto, a higher efficiency may be achieved compared to a standard antenna implementation. This may result in the capability to transmit or receive signals corresponding to or from more distant receiving or transmitting radios, as discussed above.

Figure 2:
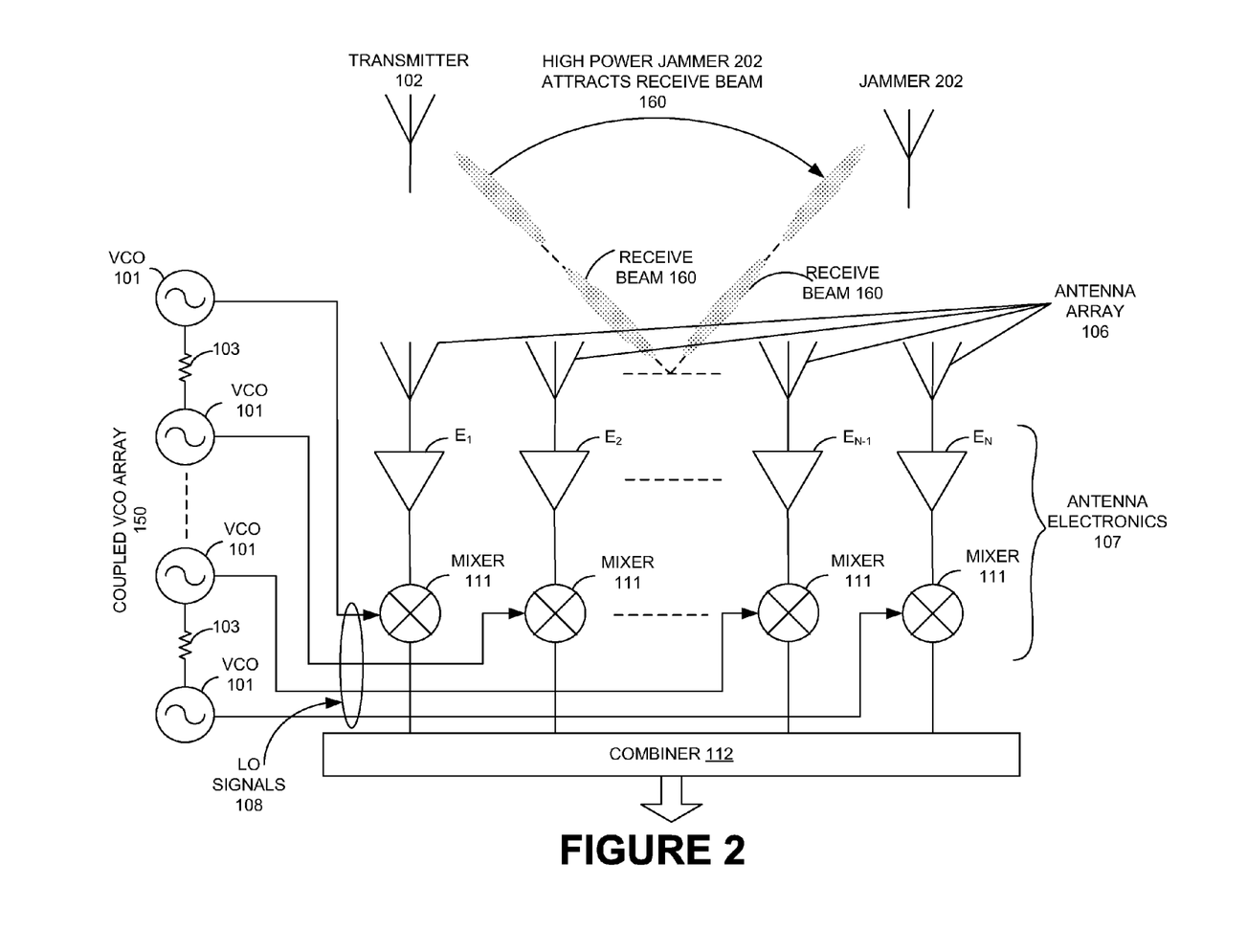
FIG. 2 is a schematic view of directivity of a retro-directive array of the beamforming system of FIG. 1 being servoed to a jammer circuit instead of a remote transmitter.
Figure 3:
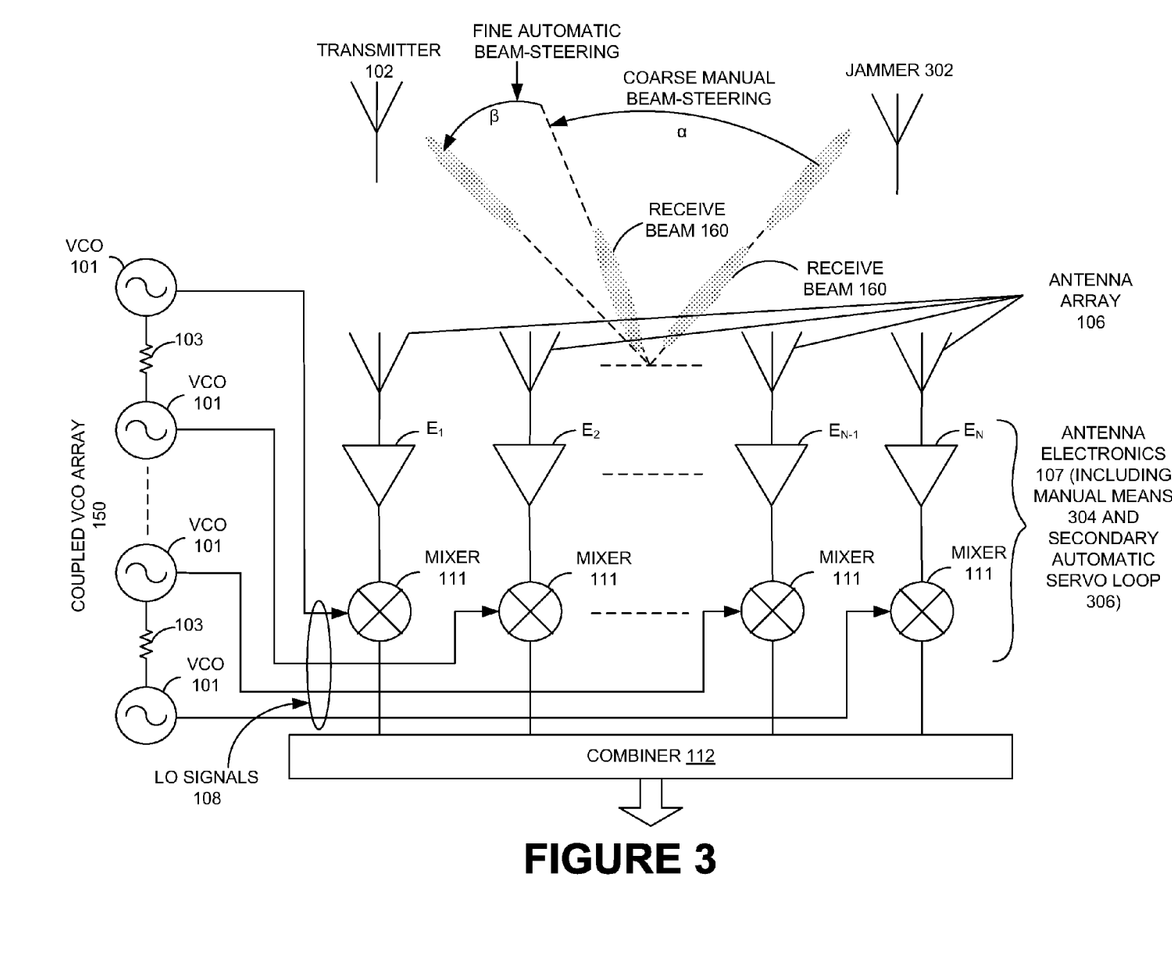
FIG. 3 is a schematic view of controlling direction of a beam even in the presence of jammer signals in the beamforming system of FIG. 1, according to one or more embodiments.

A voltage controlled oscillator (VCO) 101 (see, e.g., FIGS. 1-3) may be an electronic oscillator configured to vary oscillation frequency thereof based on a voltage input. FIGS. 1-3 serve to describe the receiver (e.g., wireless receiver) context in which exemplary embodiments discussed herein may be practiced. The function of VCO 101 in LO signal generation (e.g., LO signal 108) as applied to receivers is well known to one skilled in the art. In order to generate differential phase LO signals, a coupled VCO array may be utilized. FIG. 1 shows beamforming system 100 including a coupled VCO array 150. Here, coupled VCO array 150 may include two or more VCOs 101 mutually injection locked to each other. Injection locking may be the state in which the two or more VCOs 101 exchange oscillatory energy sufficient enough to lock to a same frequency. Injection locking may be accomplished based on coupling VCOs 101 together through a bidirectional coupling circuit (e.g., resistor 103; other bidirectional coupling circuits 103 may also be used instead).

The outputs of mixing of LO signals 108 with signals from antenna elements of antenna array 106 may be combined at combiner 112 (e.g., a combiner circuit). There may be various ways to sense the direction of the remote transmitter 102, and to servo the LO phase relationships in the LO scanned array discussed above to better receive the remote signal, or to transmit energy back in the direction of the remote signal. The aforementioned ways may also be employed to track a remote transmitter (e.g., transmitter 102) in motion relative to the retro-directive array discussed above.

A high power jammer circuit may, however, deceive the retro-directive array into servoing directivity thereof to the jammer circuit instead of the remote transmitter 102. FIG. 2 shows the abovementioned deception effected through a high power jammer 202 (or, another transmitter).

FIG. 3 shows controlling the direction of receive beam 160 even in the presence of jammer signals to allow receive beam 160 to automatically align in the direction of the remote transmitter 102, according to one or more embodiments. In one or more embodiments, the aforementioned alignment may be enhanced to a fine resolution, as will be discussed below.

As such, in one or more embodiments, a hybrid system providing for both manual and automatic means to electronically point antenna array 106 may be realized, as shown in FIG. 3. First, in one or more embodiments, a manual means 304 of pointing antenna array 106 may be implemented (e.g., through antenna electronics 107) to ignore all jammer signals (e.g., from another remote transmitter or a jammer 302) and to move the pointing of antenna array 106 through angle α (a first angle). In one or more embodiments, once the manual pointing is done, a secondary automatic servo loop 306 (e.g., also implemented in antenna electronics 107 in FIG. 3) may be engaged to point antenna array 106 through angle β (a second angle) such that receive beam 160 points to, and tracks, desired transmitter 102.

The abovementioned pointing operations may be classified under coarse manual pointing and automatic fine pointing. In one or more embodiments, here, the retro-directive array may not react to jammer 302 because the manual pointing controls an approximate pointing of the array in a direction away from jammer 302. In one or more embodiments, the control capability of the secondary automatic servo pointing may be limited to operation over a limited pointing angle (e.g., the second angle); the aforementioned limiting may be effected through secondary automatic servo loop 306.

Thus, exemplary embodiments may provide for automatic high-resolution adaptive beam-steering that is effective even in the presence of jammer signals. It will be appreciated that concepts disclosed herein may also be applied to two-dimensional or three-dimensional arrays of coupled VCOs 101, in addition to one-dimensional arrays thereof.

Figure 4:
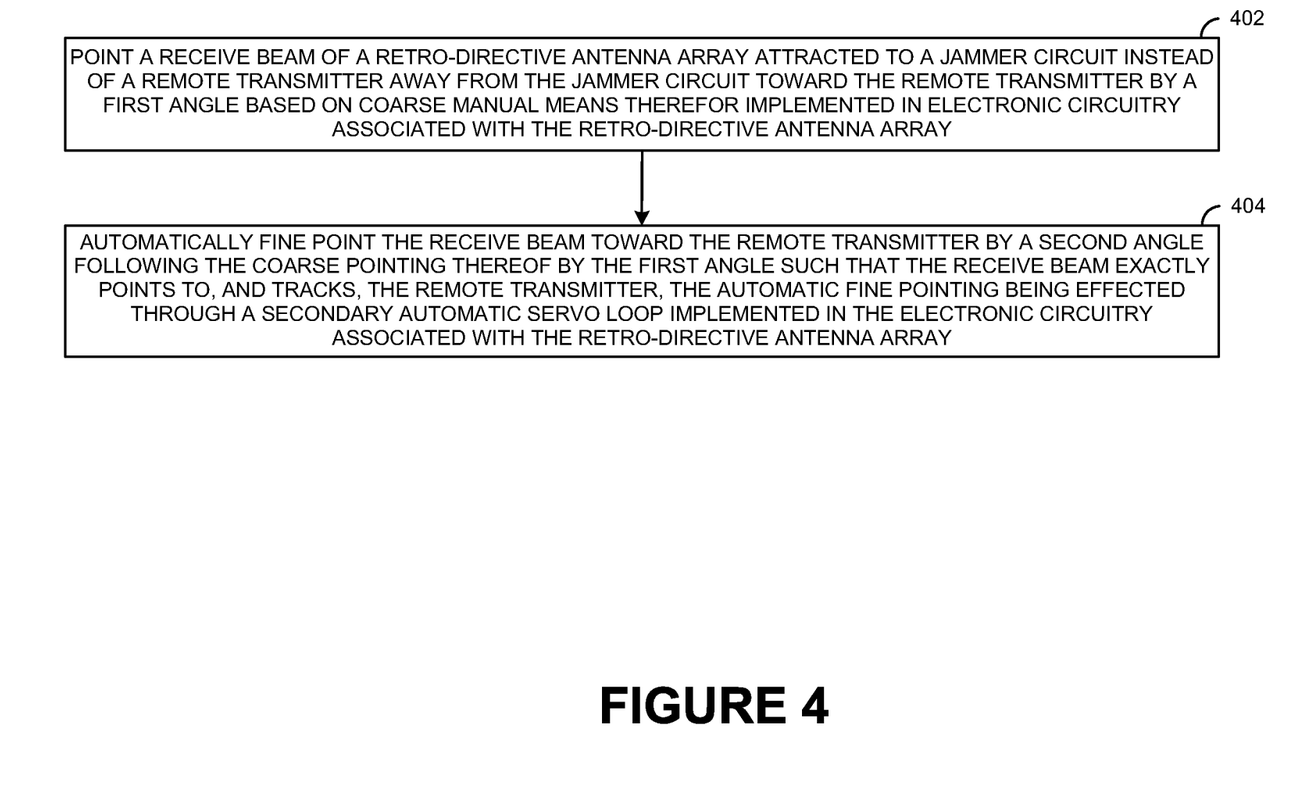
FIG. 4 is a process flow diagram detailing operations involved in automatic high-resolution adaptive beam-steering in the beamforming system of FIG. 1, according to one or more embodiments.

FIG. 4 shows a process flow diagram detailing operations involved in automatic high-resolution adaptive beam-steering, according to one or more embodiments. In one or more embodiments, operation 402 may involve pointing receive beam 160 of retro-directive antenna array 106 including a number of antenna elements attracted to a jammer circuit (e.g., jammer 302) instead of a remote transmitter (e.g., transmitter 102) away from the jammer circuit toward the remote transmitter by a first angle based on coarse manual means 304 therefor implemented in electronic circuitry (e.g., antenna electronics 107) associated with retro-directive antenna array 106. In one or more embodiments, the electronic circuitry includes a number of mixers 111, each of which is configured to mix an LO signal 108 generated from a VCO 101 of coupled VCO array 150 including a number of VCOs 101 with a signal received at an antenna element.

In one or more embodiments, operation 404 may then involve automatically fine pointing receive beam 160 toward the remote transmitter by a second angle following the coarse pointing thereof by the first angle such that the receive beam exactly points to, and tracks, the remote transmitter. In one or more embodiments, the automatic fine pointing may be effected through secondary automatic servo loop 306 implemented in the electronic circuitry associated with retro-directive antenna array 106.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method comprising:
   implementing, through electronic circuitry of a retro-directive antenna array comprising a plurality of antenna elements, a capability to ignore a jammer circuit by the retro-directive antenna array during presence of the jammer circuit, the electronic circuitry further comprising a plurality of mixers, each of which is configured to mix a Local Oscillator (LO) signal generated from a Voltage Controlled Oscillator (VCO) of a coupled VCO array comprising a plurality of VCOs with a signal received at an antenna element;
   in the presence of the jammer circuit, moving, based on the implemented capability through the electronic circuitry, pointing of a receive beam of the retro-directive antenna array toward a remote transmitter and away from the jammer circuit; and
   automatically fine pointing the receive beam toward the remote transmitter following the moving thereof such that the receive beam exactly points to, and tracks, the remote transmitter, the automatic fine pointing being effected through a secondary automatic servo loop implemented in the electronic circuitry associated with the retro-directive antenna array.

2. The method of claim 1, comprising regarding, through the electronic circuitry, another remote transmitter as the jammer circuit during the moving of the pointing of the receive beam.

3. The method of claim 1, further comprising injection locking two or more VCOs of the coupled VCO array to each other.

4. The method of claim 1, further comprising coupling a VCO of the coupled VCO array to another VCO thereof through a bidirectional coupling circuit.

5. The method of claim 1, comprising providing one of: a one-dimensional, a two-dimensional and a three-dimensional VCO array as the coupled VCO array.

6. The method of claim 1, comprising limiting the automatic fine pointing to operation over a limited pointing angle.

7. The method of claim 1, further comprising combining outputs of the plurality of mixers as part of beamforming with the retro-directive antenna array.

8. A beam-steering system comprising:
   a retro-directive antenna array comprising a plurality of antenna elements, a receive beam of the retro-directive antenna array being attracted to a jammer circuit instead of a remote transmitter;
   electronic circuitry associated with the retro-directive antenna array implemented with a capability to ignore the jammer circuit, and, in accordance therewith, move pointing of the receive beam away from the jammer circuit toward the remote transmitter, the electronic circuitry comprising a plurality of mixers, each of which is configured to mix a LO signal generated from a VCO of a coupled VCO array comprising a plurality of VCOs with a signal received at an antenna element; and
   a secondary automatic servo loop implemented in the electronic circuitry associated with the retro-directive antenna array for automatic fine pointing of the receive beam toward the remote transmitter following the moving of the pointing of the receive beam toward the remote transmitter such that the receive beam exactly points to, and tracks, the remote transmitter.

9. The beam-steering system of claim 8, wherein the electronic circuitry is configured to regard another remote transmitter as the jammer circuit during the moving of the pointing of the receive beam.

10. The beam-steering system of claim 8, wherein two or more VCOs of the coupled VCO array are configured to be injection locked to each other.

11. The beam-steering system of claim 8, wherein a VCO of the coupled VCO array is configured to be coupled to another VCO thereof through a bidirectional coupling circuit.

12. The beam-steering system of claim 8, wherein the coupled VCO array is one of: a one-dimensional, a two-dimensional and a three-dimensional VCO array.

13. The beam-steering system of claim 8, wherein the secondary automatic servo loop is configured to limit the automatic fine pointing to operation over a limited pointing angle.

14. The beam-steering system of claim 8, further comprising a combiner circuit to combine outputs of the plurality of mixers as part of beamforming with the retro-directive antenna array.

15. A wireless communication system comprising:
   a remote transmitter;
   a jammer circuit; and
   a beam-steering system comprising:
      a retro-directive antenna array comprising a plurality of antenna elements, a receive beam of the retro-directive antenna array being attracted to the jammer circuit instead of the remote transmitter;
      electronic circuitry associated with the retro-directive antenna array implemented with a capability to ignore the jammer circuit, and, in accordance therewith, move pointing of the receive beam away from the jammer circuit toward the remote transmitter, the electronic circuitry comprising a plurality of mixers, each of which is configured to mix a LO signal generated from a VCO of a coupled VCO array comprising a plurality of VCOs with a signal received at an antenna element; and
      a secondary automatic servo loop implemented in the electronic circuitry associated with the retro-directive antenna array for automatic fine pointing of the receive beam toward the remote transmitter following the moving of the pointing of the receive beam toward the remote transmitter such that the receive beam exactly points to, and tracks, the remote transmitter.

16. The wireless communication system of claim 15, wherein the electronic circuitry associated with the retro-directive antenna array of the beam-steering system is configured to regard another remote transmitter as the jammer circuit during the moving of the pointing of the receive beam.

17. The wireless communication system of claim 15, wherein two or more VCOs of the coupled VCO array of the beam-steering system are configured to be injection locked to each other.

18. The wireless communication system of claim 15, wherein a VCO of the coupled VCO array of the beam-steering system is configured to be coupled to another VCO thereof through a bidirectional coupling circuit.

19. The wireless communication system of claim 15, wherein the secondary automatic servo loop of the beam-steering system is configured to limit the automatic fine pointing to operation over a limited pointing angle.

20. The wireless communication system of claim 15, wherein the beam-steering circuit further comprises a combiner circuit to combine outputs of the plurality of mixers as part of beamforming with the retro-directive antenna array.

* * * * *